US010059425B2

(12) United States Patent
Vetter et al.

(10) Patent No.: US 10,059,425 B2
(45) Date of Patent: Aug. 28, 2018

(54) AIRCRAFT HAVING A SELF-ERECTING PARTITION ELEMENT IN A COMPARTMENT INSIDE THE FUSELAGE

(71) Applicant: Airbus Operations GmbH, Hamburg (DE)

(72) Inventors: Ferdinand Vetter, Hamburg (DE); Stefan Loebel, Hamburg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 14/706,476

(22) Filed: May 7, 2015

(65) Prior Publication Data

US 2015/0321744 A1 Nov. 12, 2015

(30) Foreign Application Priority Data

May 9, 2014 (EP) .................................... 14167702

(51) Int. Cl.
*B64C 1/34* (2006.01)
*B64C 1/40* (2006.01)
(Continued)

(52) U.S. Cl.
CPC ................. *B64C 1/34* (2013.01); *B64C 1/10* (2013.01); *B64C 1/40* (2013.01); *B64D 11/0023* (2013.01)

(58) Field of Classification Search
CPC .... B64C 1/34; B64C 1/10; B64C 1/40; B64D 11/0023; B64D 2201/00; B64D 11/00; B63B 25/24
See application file for complete search history.

(56) References Cited

U.S. PATENT DOCUMENTS 3,423,121 A * 1/1969 Lipkin ................... B60R 21/06
160/229.1
4,899,962 A * 2/1990 Mueller ............. B64D 11/0023
160/354
(Continued)

FOREIGN PATENT DOCUMENTS

| CN | 103708020 | 4/2014 |
| EP | 0325756 | 8/1989 |
| GB | 2169865 | 7/1986 |

OTHER PUBLICATIONS

European Search Report, dated Oct. 30, 2014.
Chinese Office Action, dated Aug. 3, 2016.

*Primary Examiner* — Medhat Badawi
*Assistant Examiner* — Vicente M Rodriguez
(74) *Attorney, Agent, or Firm* — Greer, Burns & Crain Ltd.

(57) ABSTRACT

An aircraft comprising a fuselage defining a longitudinal axis and an interior compartment. Along the axis, in cross-section perpendicular to the axis, the compartment is enclosed by a floor, sidewall and ceiling structure. The aircraft further comprises an environmental control system comprising a conduit system through which a pressurized fluid is supplied, at least one first terminal disposed inside the compartment and in fluid communication with the conduit system, and a selectively inflatable and deflatable partition element. The partition element comprises at least one second terminal and is constructed such that it is inflatable from a deflated condition into an inflated condition by establishing a fluid communication between the second terminal and the first terminal. In the inflated condition the partition element completely closes the cross-section of the compartment, thereby dividing it into two portions, and in the deflated condition collapses and at least partially unblocks the cross section.

14 Claims, 2 Drawing Sheets

(51) Int. Cl.
*B64C 1/10* (2006.01)
*B64D 11/00* (2006.01)

(56) References Cited

U.S. PATENT DOCUMENTS

| | | | | |
|---|---|---|---|---|
| 5,437,301 | A * | 8/1995 | Ramsey | B60P 7/065 137/231 |
| 8,240,604 | B2 * | 8/2012 | Opp | B64C 1/18 244/118.5 |
| 8,365,804 | B1 * | 2/2013 | Genovese | E06B 3/80 160/351 |
| 2007/0113486 | A1 * | 5/2007 | Howland | A62C 2/10 52/1 |
| 2011/0084166 | A1 * | 4/2011 | Hartel | B64C 1/10 244/120 |
| 2014/0094103 | A1 * | 4/2014 | Dreyhaupt | B60H 1/00457 454/76 |

* cited by examiner

AIRCRAFT HAVING A SELF-ERECTING PARTITION ELEMENT IN A COMPARTMENT INSIDE THE FUSELAGE

CROSS-REFERENCES TO RELATED APPLICATIONS

This application claims the benefit of the European patent application No. 14167702.1 filed on May 9, 2014, the entire disclosures of which are incorporated herein by way of reference.

BACKGROUND OF THE INVENTION

The present application relates to an aircraft comprising a fuselage defining a longitudinal axis of the aircraft and a compartment inside the fuselage, wherein along the longitudinal axis, in cross-section perpendicular to the longitudinal axis, the compartment is enclosed by a floor structure and a sidewall and ceiling structure extending from and above the floor structure, wherein the aircraft further comprises a partition element adapted for selectively closing a cross-section of the compartment, thereby dividing the compartment into different portions.

It is often desirable to divide an interior compartment in the fuselage of an aircraft into different areas or portions in which different temperatures prevail or can be maintained. For example, in aircraft having a cargo compartment and a cargo door, such as a rear cargo compartment and a rear cargo door, without taking specific constructional measures for the cargo door in order to provide for suitable thermal insulation, large temperature gradients with very low temperatures in the immediate vicinity of the cargo door tend to occur throughout the compartment and it is difficult to achieve and maintain a temperature suitable for the transport of passengers inside the compartment. Such constructional measures may not be desirable in certain applications requiring, e.g., quick loading and unloading. This applies, for example, to military aircraft having an aft ramp and cargo door arrangement and a corresponding aft cargo compartment, for which it is desirable to also be able to use it for the transport of troops and other passengers.

For the purpose of dividing interior aircraft compartments partition elements in the form of a thermal curtain are known which can be secured at least to the ceiling of the compartment and close the entire cross-section of the compartment, thereby providing thermal insulation between the two portions into which the compartment is divided by the thermal curtain. However, due to the fact that cargo compartments and other compartments may have a considerable height, installation of such thermal curtains requires the use of a ladder, which may increase the installation time and can be difficult in particular when installation is carried out during flight. Thermal curtains not closing the cross-section in the ceiling area are not sufficient to provide sufficient thermal insulation.

SUMMARY OF THE INVENTION

Therefore, it is an object of the present invention to provide an aircraft with a removable partition element which provides for thermal insulation between different portions of an aircraft compartment and which can be quickly, easily and reliably installed by a single person and overcomes the problems mentioned above.

According to the present invention an aircraft comprises a fuselage defining a longitudinal axis of the aircraft and also comprises a compartment inside the fuselage. Preferably, the compartment is a cargo compartment extending along the longitudinal axis between a front end and a rear end, wherein a cargo door is arranged at the second end.

In cross-section perpendicular to the longitudinal axis and along the longitudinal axis, the compartment is enclosed or bounded by a floor structure and a sidewall and ceiling structure extending from and above the floor structure. The aircraft further comprises an environmental control system comprising a conduit system in which in operation a fluid with an overpressure with respect to the interior pressure in the compartment is present.

Inside the compartment one or more first terminals are provided which are in fluid communication with the conduit system, so that in operation the fluid can exit each of the first terminals under overpressure with respect to the pressure inside the compartment.

Moreover, the aircraft comprises a selectively inflatable and deflatable partition element, preferably adjacent to a cargo door. The partition element in turn comprises one or more second terminals and is constructed such that it is inflatable from a deflated condition into an inflated erected condition by establishing a fluid communication between one or more of the second terminals and one or more of the first terminals. Establishing fluid communication results in fluid from the conduit system of the environmental control system exiting through the respective first terminal(s) and entering the partition element through the respective second terminal(s), thereby filling and inflating the partition element. In the inflated and erected condition the partition element completely closes the cross-section of the compartment, thereby dividing it into two portions. For this purpose the shape and dimensions of the partition element are adapted to the cross-sectional shape and dimensions of the compartment. Advantageously, the shapes correspond or essentially correspond to each other and the dimensions of the partition element in the inflated condition are somewhat larger than a cross-sectional dimension of the compartment, so that in the inflated condition the partition element circumferentially and securely abuts and presses against the floor structure and the sidewall and ceiling structure, thereby reliably insulating the two portions of the compartment from each other. However, in the deflated condition, when there is no fluid communication between the at least one second terminal and at least one of the at least one first terminal, the partition element collapses at least partially so that the cross section of the compartment is at least partially unblocked. Thus, the separation of the compartment can be cancelled by simply disconnecting the first and second terminals which preferably results in completely collapsing of the partition element.

The above construction provides the advantage that the partition element is self-erecting from the floor structure and, when not in use, can be easily stored, for example, at a door of the compartment, without taking up a lot of space. Thus, the partition element can be easily, quickly, safely and reliably installed by a single person without having to use a ladder or similar means. For installation it is only necessary to take the partition element in its deflated condition from a storage location to the desired installation location, to possibly unfold it on the floor structure, and to connect the one or more second terminals to suitable ones of the one or more first terminals. The partition element is then inflated by the fluid from the environmental control system, which fluid is preferably heated as compared to the interior temperature of one of the portions of the compartment in order to make the thermal insulation more efficient. During inflation the person installing the partition element may guide it into the correct position. In the installed condition the first and second terminals preferably remain interconnected in order to ensure that the partition element stays properly inflated during use. De-installation merely requires disconnecting the first and second terminals, following which the weight of the partition element causes it to collapse.

Finally, if at all the above-described installation and use of the partition element requires only minor modifications to the aircraft, such as the provision of the first terminals, if they are not already present. In any case no additional system for providing a compressed fluid is required as the already existing environmental control system is employed.

Preferably, the environmental control system supplies compartment air as the fluid to the compartment. Thus, air which is used to be supplied as the compartment air for the compartment is also supplied to the partition element. The air supplied to the compartment is conditioned such that is has an elevated temperature but this temperature will not exceed critical values, so that there is no risk that the material of the partition element is damaged. Furthermore, as the compartment air is heated up by the environmental system to a temperature which is suitable for passengers in the compartment, the partition element will also be heated up to this temperature or at least to a temperature which is above the temperature in the region in the vicinity of a cargo door so that the partition element is very efficient as a thermal barrier.

Moreover, it is preferred when the partition element comprises one or more attachment devices adapted for releasably securing the partition element in its inflated and erected condition to a component of the aircraft, such that upon exceeding a certain pressure difference between the two portions of the compartment, a first portion of the partition element adjacent to the floor structure is retained in its position and a portion of the partition element adjacent to a ceiling portion of the sidewall and ceiling structure is movable by the pressure difference to open part of the cross-section of the compartment.

Due to the partition element being secured to the compartment or aircraft only in a lower portion thereof, a disadvantageous introduction of forces into the aircraft structure is avoided in cases of rapid depressurization inside the compartment, because the upper portion of the partition element may then move to partially open the cross-section at the location of the partition element. The partition element in fact behaves like a decompression flap. In addition, to achieve this effect, it is only necessary to secure the partition element to the compartment using attachment devices at locations within reach of the person while standing on the floor structure so that no ladders or the like are required which would prevent the coupling of the partition element with the compartment during flight.

In a preferred embodiment, the aircraft further comprises one or more fittings secured to a sidewall of the sidewall and ceiling structure and/or to the floor structure. Each such fitting is constructed such that one of the attachment devices can be selectively attached to and detached from it. In other words, the fittings are components or elements which are adapted to cooperate with the attachment devices to secure the attachment devices and, thus, the partition element to the fittings.

In this embodiment, it is further preferred if one or more of the fittings is provided at each of a plurality of different locations spaced along the longitudinal axis. This enables selective installation and securing of the partition element at each of the plurality of different axial locations. Preferably two or more of the fittings are provided in a spaced manner at each of the plurality of different locations in order to enable reliable securing of the partition element at each of the locations.

In a preferred embodiment the aircraft further comprises one or more seat rails extending inside the compartment, preferably parallel to the longitudinal axis. The one or more attachment devices are adapted to be selectively attachable to and detachable from at least one of these seat rails. In other words, the seat rail or seat rails provide attachment points in addition to or instead of fittings as described above. The use of seat rails has the advantage that additional fittings can be saved and multiple installation locations along the longitudinal axis can be provided in a particularly simple manner.

In a preferred embodiment, each of the one or more attachment devices comprises a hook, a loop, a strap and/or a hook and loop fastener.

In a preferred embodiment, each of the at least one first terminal comprises a first connector and each of the at least one second terminal comprises a second connector. The first and second connectors may be adapted to be matingly interconnected directly, thereby establishing fluid communication. In this regard it is possible and may be advantageous if the first connector and/or the second connector are provided at a terminal end of a selectively extractable and retractable tube provided as part of or inside the first and second terminal, respectively. Alternatively or additionally an interconnection tube may be provided having mating connectors at terminal ends thereof, which mating connectors are adapted to be matingly connected to the first connector and the second connector, respectively, thereby establishing fluid communication.

In a preferred embodiment, one or more of the one or more first terminals is provided at each of a plurality of different locations spaced along the longitudinal axis, which are preferably identical to the plurality of different locations mentioned above for the optional fittings. In this manner, the one or more second terminals of the partition element can be selectively connected to corresponding ones of the one or more first terminals depending on the installation location of the partition element. This avoids having to use, e.g., long interconnection tubes.

In a preferred embodiment, at least one location along the longitudinal axis at least two of the first terminals are provided on opposite sides of the longitudinal axis. In that case it is also preferred for the partition element to have two of the second terminals at opposite sides thereof. Use of such two spaced second terminals may ensure reliable inflation of the partition element and provides for the possibility of constructing the partition element with two separate internal cavities receiving the pressurized fluid from the environmental control system. For example, each such cavity may be provided in another half of the partition element, thereby facilitating folding and transport of the partition element.

In a preferred embodiment, each of the one or more first terminals and/or each of the one or more second terminals comprise a closure device adapted to sealingly close the respective terminal. The closure device, which may be, e.g., a cap or plug, can be removed when desiring to interconnect the first and second terminals.

Furthermore, is also preferred if the partition element comprises at least one first U- or arc-shaped tube, which forms a portion of an outer circumferential edge of the partition element and is adapted to sealingly and continuously contact the sidewall and ceiling structure in the inflated condition of the partition element. Such a structure ensures that tight fit between the partition element and the sidewall and ceiling structure is achieved when the partition element is in the inflated condition.

In addition it is preferred that the partition element comprises a plurality of second tubes each being in fluid communication with at least one of the at least one first tube, the second tubes being arranged in the area surrounded by the U- or arc-shaped at least one first tube. Such a structure ensures that the partition element over the entire cross section of the compartment is supplied with the fluid from the environmental control system and preferably with heated compartment air, so that it is effective as a thermal barrier over the entire cross section. Further, constructing the partition element from multiple tubes allows keeping the thickness of the partition element relatively small in the deflated condition and facilitates full inflation with good insulation properties.

In a further preferred embodiment, the partition element comprises a window, e.g., of polycarbonate, a door or flap and/or an opening which can be selectively opened and closed, e.g., by means of hook and loop fasteners or a zipper. Further, it is preferred, when the partition element is made of or comprises parachute silk.

BRIEF DESCRIPTION OF THE DRAWINGS

In the following an exemplary embodiment of an aircraft according to the present invention will be explained in more detail with reference to the drawings.

DETAILED DESCRIPTION OF THE PREFERRED EMBODIMENTS

Figure 1:
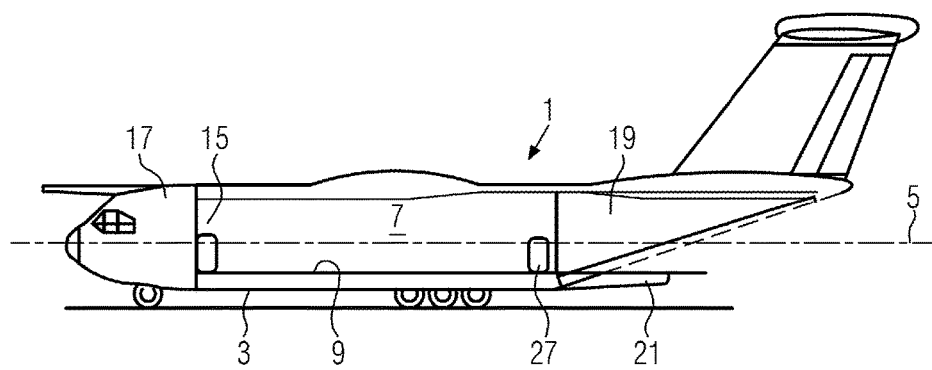
FIG. 1 shows a side view of the exemplary embodiment of an aircraft.

In FIG. 1 an embodiment of an aircraft 1 is shown which comprises a fuselage 3 that defines a longitudinal axis 5 of the aircraft 1. Inside the fuselage 3 a cargo compartment 7 is provided, and along the longitudinal axis 5 the compartment 7 is, in a cross-section perpendicular to the longitudinal axis 5, enclosed by a floor structure 9 and a sidewall and ceiling structure which extends away from floor structure 9 and is arranged above the floor structure 9. The side wall and ceiling structure is formed by side walls 11 extending generally vertically from the floor structure 9 and a ceiling 13 which connects to the sidewalls 11 at a distance above the floor structure 9.

The cargo compartment 7 extends along the longitudinal axis 5 between a front end 15 adjacent to the cockpit 17 and a second end 19. In the vicinity of the second end 19 a cargo door 21 is pivotably mounted on the fuselage 3 so that the cargo door 21 may pivot between closed and open positions, wherein in the open position the cargo door 21 is pivoted downwardly so that the distal end lies on the ground and vehicles may roll into or out of the cargo compartment 7.

Figure 3:
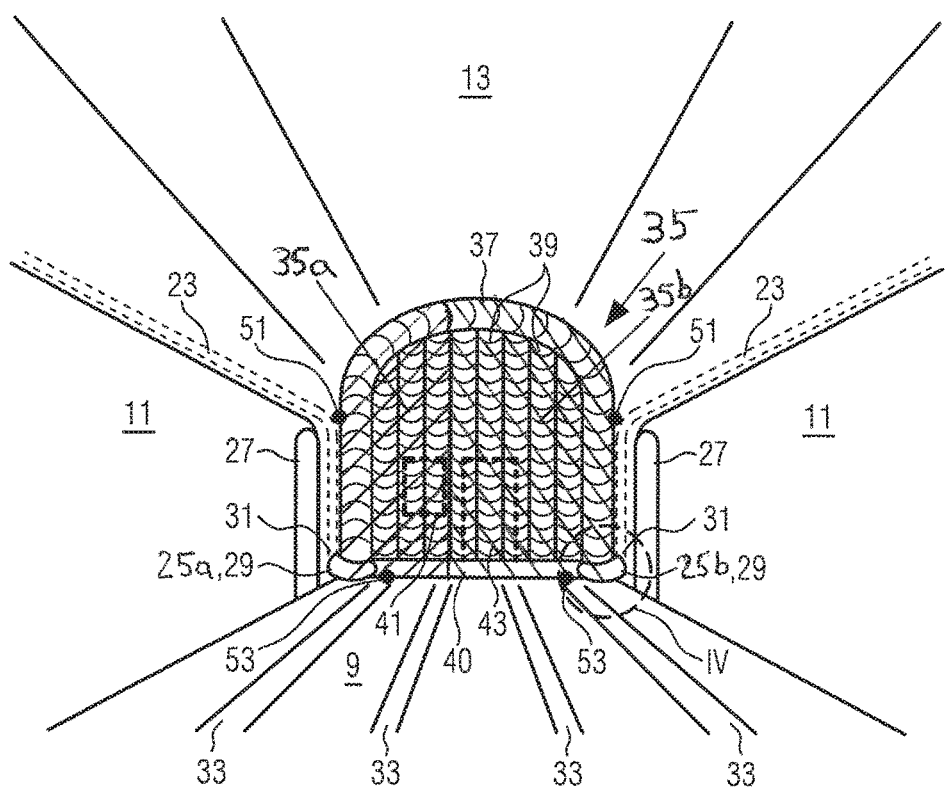
FIG. 3 is a perspective view along the compartment parallel to the longitudinal axis towards the rear of the embodiment shown in FIG. 1.

Further, as indicated in FIG. 3, the aircraft 1 comprises an environmental control system having a conduit system 23 through which in operation a fluid with an overpressure, with respect to the interior pressure in the cargo compartment 7, is supplied. In this preferred exemplary embodiment, the environmental control system supplies compartment air as the fluid to the cargo compartment 7 via additional openings not shown in detail.

The conduit system 23 of the environmental control system is provided with first terminals 25 disposed on the side wall 11 close to the floor structure 9 inside the compartment 7 and being in fluid communication with the conduit system 23. The first terminals 25 are positioned at a location along the longitudinal axis 5 on that side of rear lateral doors 27 near the rear end 19 of the compartment 7 so that the first terminals 25 are provided on opposite sides of the longitudinal axis 5. Each of the first terminals 25 is provided with a first connector 29 and comprises a closure device in the form of a blind flange 31 adapted to sealingly close the respective first terminal 25 or connector 29. Moreover, the floor structure 9 is provided with longitudinally extending seat rails 33 which allow to fix elements on the floor structure 9.

Figure 2:
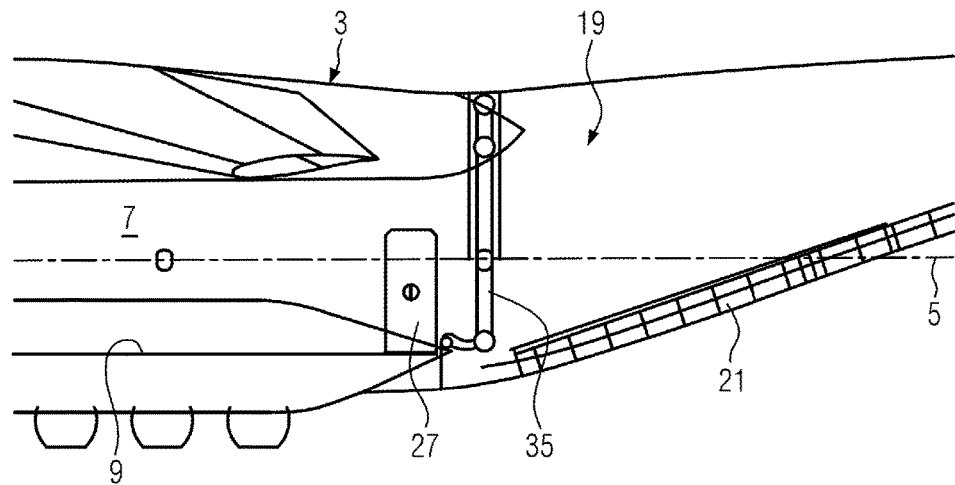
FIG. 2 shows a cross sectional view of the rear part of the embodiment shown in FIG. 1.

As shown in FIGS. 2 and 3, an inflatable partition element 35 is arranged adjacent to the cargo door 21 near the rear end 19 of the compartment 7 and, in its inflated condition, extends perpendicularly to the longitudinal axis 5. The partition element 35 comprises a first U- or arc-shaped outer tube 37, which forms the outer circumferential edge of the partition element 35 and sealingly and continuously contacts the sidewall 11 and the ceiling 13 when the partition element 35 is in the inflated condition, as will be described in the following in more detail. Further, the partition element 35 comprises a plurality of vertically extending second tubes 39, each being in fluid communication with the U-shape first tube 37. The second tubes 39 are arranged in the area enclosed by the U-shaped tube 37 and the floor structure 9 so that this area is entirely filled with the second tubes 39. Neighboring second tubes 39 are connected with each other and the laterally arranged second tubes 39, as well as the upper ends of the second tubes 39, are fixedly connected with the first tube 37. Finally, a third tube 40 extends between the bottom ends of the first tube 37, as well as along the lower ends of the second tubes 39, and is fixedly connected to both the first and the second tubes 37, 39. Further, the third tube 40 is also in fluid communication with the first and second tubes 37, 39. In the inflated condition of the partition element 35 the third tube 40 sealingly abuts on the floor structure 9.

Firstly, it is conceivable that the partition element 35 comprises two separate cavities 35a, 35b which are not in fluid communication with each other and which are independently supplied with compartment air via the first terminals 25a, 25b on opposite sides of the longitudinal axis. Secondly, as indicated in dashed lines, the partition element 35 may comprise a window 41, e.g., of polycarbonate, or a door element 41, so as to allow the passing of the pass partition element 35, even though it completely closes the cross section perpendicular to the longitudinal axis 5 of the compartment 7.

Figure 4:
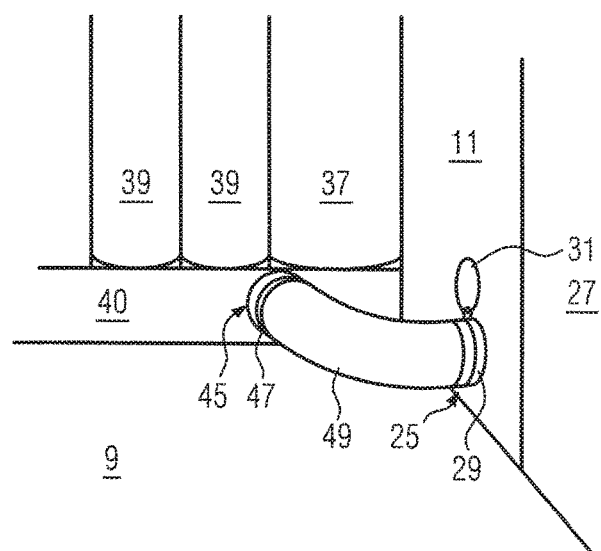
FIG. 4 is an enlarged view of the portion indicated with IV in FIG. 3.

The inflatable partition element 35 is provided with second terminals 45 which are arranged laterally and adjacent to the bottom end of the partition element 35 near the floor structure 9 (see FIG. 4). The second terminals 45 are in fluid communication with the first and second tubes 37, 39 and comprise a second connector 47 which is adapted to be matingly connected with the first connector 29, so that a fluid communication between the first and second terminal 25, 45 can be established.

However, in this preferred embodiment, an interconnection tube 49 is employed having mating connectors at terminal ends thereof, which mating connectors are adapted to be matingly connected with the first and second connectors 29, 47 so that a fluid communication is established as well.

By means of the releasable connection with the environmental control system, the partition element 35 is selectively inflatable and deflatable. Further, due to the construction of flexible tubes 37, 39, which, for example, can be made of parachute silk, the partition element 35 is inflatable from a deflated and collapsed condition into an inflated erected condition by establishing the fluid communication between the first and second terminals 25, 45.

As shown in the drawings, in the inflated erected condition the partition element 35 completely closes the cross-section of the cargo compartment 7 adjacent to the cargo door 21, thereby dividing the compartment into two portions, namely, in a main portion, between the front end 15 adjacent to the cockpit 17 and the partition element 35, and a rear portion behind the partition element 35 above the cargo door 21. In the deflated and collapsed condition the partition element 35 completely unblocks the cross section and it is possible to store it in a corresponding receptacle near the cargo door 21.

Thus, the partition element 35 is self-erecting from the floor structure 9 and can be easily stored. It can be easily, quickly, safely and reliably installed by a single person without having to use a ladder or similar means. It is only necessary to take the partition element 35 in its deflated collapsed condition from the receptacle to the desired installation location, to possibly unfold it on the floor structure 9, and to connect the first and second terminals 25, 45 via the interconnection tube 49. The partition element is then inflated by the compartment air, which is heated as compared to the interior temperature of the cargo compartment 7, so that the thermal insulation separated portion is very efficient.

During inflation, the person installing the partition element 35 may guide it into the correct position. In the installed condition, the first and second terminals 25, 45 remain interconnected in order to ensure that the partition element 35 stays properly inflated during use. Disassembly merely requires disconnecting the first and second terminals 25, 45, following which the weight of the partition element 35 causes it to collapse.

Moreover, the partition element 35 comprises attachment devices 51 for releasably securing the partition element 35 in its inflated and erected condition to the sidewall 11. For this purpose fittings are secured to the sidewall 11 so that the attachment devices 51 are selectively attachable to and detachable from the corresponding fitting. The attachment devices 51 can be formed as a hook, a loop, a strap and/or a hook and loop fastener. Furthermore, at the bottom end of the partition element 35, additional attachment devices 53 are provided which are selectively attachable to and detachable from the seat rails 33.

In this way, when the attachment devices 51, 53 are attached to the respective counterparts on the sidewalls 11 and the floor structure 9, the partition element 35 is fixed only at a lower portion thereof. Thus, upon exceeding a certain pressure difference between the two separated portions of the cargo compartment 7, the lower portion of the partition element 35 adjacent to the floor structure 9 is retained in its position and the upper portion of the partition element 35 adjacent to the ceiling 13 is movable by the pressure difference to open part of the cross-section of the compartment 7. Thus, the partition element 35 behaves similar to a decompression flap and to achieve this effect, it is only necessary to secure the partition element 35 with attachment devices 51, 53 at locations within reach of the person while standing on the floor structure 9.

Finally, it should be noted that it is conceivable that fittings are provided on the sidewall 11 at a plurality of different positions spaced along the longitudinal axis 5, so that the partition element 35 can be selectively installed and secured at each of the plurality of different axial positions. Further, a plurality of first terminals 25 may be provided at each of a plurality of different locations also spaced along the longitudinal axis 5, so that the second terminals 45 of the partition element 35 can be selectively connected to a corresponding first terminal depending on the axial installation position of the partition element 35.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage defining a longitudinal axis of the aircraft and a compartment inside the fuselage,
   wherein along the longitudinal axis, in cross-section perpendicular to the longitudinal axis, the compartment is enclosed by a floor structure and a sidewall and ceiling structure extending from and above the floor structure,
   an environmental control system comprising a conduit system through which, in operation, a fluid with an overpressure with respect to the interior pressure in the compartment is supplied,
   at least one first terminal spaced from the floor structure and arranged at the sidewall, disposed inside the compartment and in fluid communication with the conduit system, and
   a selectively inflatable and deflatable partition element which
   comprises at least one second terminal and is constructed such that it is inflatable from a deflated condition into an inflated condition by establishing a fluid communication between the at least one second terminal and at least one of the at least one first terminal,
   wherein in the inflated condition, the partition element completely closes the cross-section of the compartment, such that the partition element is dividing the compartment into two portions, and in the deflated condition collapses and at least partially unblocks the cross section of the compartment,
   wherein the at least one second terminal of the partition is arranged on a front side of the partition element, such that the at least one second terminal faces in longitudinal direction of the fuselage when the partition element is in the inflated condition,
   wherein each of the at least one first terminal comprises a first connector and each of the at least one second terminal comprises a second connector;

wherein an interconnection tube arranged within the compartment is provided having mating connectors at the terminal ends thereof, which mating connectors are matingly connected to the first connector and the second connector, respectively, thereby establishing fluid communication, wherein a circumferential lateral surface of the partition element is free of any terminal, and wherein in the inflated condition, the circumferential lateral surface of the partition element is continuously and entirely in contact with the sidewall, the ceiling structure and the floor structure, respectively.

2. The aircraft according to claim 1, wherein the environmental control system supplies compartment air as the fluid to the compartment.

3. The aircraft according to claim 1, wherein the partition element comprises the at least one attachment device adapted for releasably securing the partition element in its inflated condition to a component of the aircraft, such that upon a pressure difference between the two portions of the compartment exceeding a certain threshold, a first portion of the partition element adjacent to the floor structure is retained in its position and a portion of the partition element adjacent to a ceiling portion of the sidewall and ceiling structure is movable by the pressure difference to open part of the cross-section of the compartment.

4. The aircraft according to claim 3, wherein the at least one attachment device is selectively attachable to and detachable from a corresponding one of the at least one fitting.

5. The aircraft according to claim 3, further comprising at least one seat rail extending inside the compartment, wherein the at least one attachment device is selectively attachable to and detachable from at least one of the at least one seat rail.

6. The aircraft according to claim 3, wherein the at least one attachment device comprises at least one of a hook, a loop, a strap and a hook and loop fastener.

7. The aircraft according to claim 1, wherein at one or more locations along the longitudinal axis at least two of the at least one first terminal are provided on opposite sides of the longitudinal axis.

8. The aircraft according to claim 1, wherein at least one of the at least one first terminal and the at least one second terminal comprises a closure device adapted to sealingly close the respective terminal.

9. The aircraft according to claim 1, wherein the partition element comprises at least one first U- or arc-shaped tube, which forms a portion of an outer circumferential edge of the partition element and is configured to sealingly and continuously contact the sidewall and ceiling structure in the inflated condition of the partition element.

10. The aircraft according to claim 9, wherein the partition element comprises a plurality of second tubes each in fluid communication with at least one of the at least one first tube, the second tubes arranged in the area surrounded by the U- or arc-shaped at least one first tube.

11. The aircraft according to claim 1, wherein the partition element comprises two separate cavities for receiving the pressurized fluid from the environmental control system, which are not in fluid communication with each other.

12. The aircraft according to claim 1, wherein the partition element comprises at least one of a window, a door or flap and an opening which can be selectively opened and closed.

13. The aircraft according to claim 1, wherein the compartment is a cargo compartment extending along the longitudinal axis between a front end and a rear end of the aircraft and wherein a cargo door is arranged at the rear end.

14. The aircraft according to claim 13, wherein the partition element is arranged adjacent to the cargo door.

* * * * *